United States Patent
Richardson et al.

(10) Patent No.: US 9,217,684 B2
(45) Date of Patent: Dec. 22, 2015

(54) OXYGEN SYSTEM HAVING SENSORS WITH A PASSIVE RFD INTERFACE

(71) Applicant: B/E Aerospace, Inc., Wellington, FL (US)

(72) Inventors: Chad Richardson, Lawrence, KS (US); Wayne Noehren, Olathe, KS (US)

(73) Assignee: B/E AEROSPACE, INC., Wellington, FL (US)

( * ) Notice: Subject to any disclaimer, the term of this patent is extended or adjusted under 35 U.S.C. 154(b) by 163 days.

(21) Appl. No.: 14/041,752

(22) Filed: Sep. 30, 2013

(65) Prior Publication Data

US 2014/0150561 A1 Jun. 5, 2014

Related U.S. Application Data

(60) Provisional application No. 61/732,160, filed on Nov. 30, 2012.

(51) Int. Cl.
| | |
|---|---|
| *G01L 7/18* | (2006.01) |
| *G01L 9/00* | (2006.01) |
| *G01L 19/08* | (2006.01) |
| *G01L 19/14* | (2006.01) |

(52) U.S. Cl.
CPC ............... *G01L 9/00* (2013.01); *G01L 19/086* (2013.01); *G01L 19/143* (2013.01)

(58) Field of Classification Search
CPC ........ G01L 9/00; G01L 19/143; G01L 19/086
USPC .................... 73/753, 724, 717, 718
See application file for complete search history.

(56) References Cited

U.S. PATENT DOCUMENTS

| | | | |
|---|---|---|---|
| 5,181,423 A | | 1/1993 | Philipps et al. |
| 5,760,301 A | * | 6/1998 | Shuman, Jr. ............... 73/199 |
| 5,987,980 A | * | 11/1999 | Mangafas ........... B60C 23/0408 340/447 |
| 7,140,257 B2 | * | 11/2006 | Henson ................ G01L 7/043 73/732 |
| 7,636,053 B2 | * | 12/2009 | Spare et al. .................. 73/718 |
| 7,730,772 B2 | * | 6/2010 | Cook et al. .................. 73/717 |
| 8,047,079 B2 | * | 11/2011 | Bleys ................. F17C 13/025 73/714 |
| 2004/0113813 A1 | * | 6/2004 | Henson ................ G01L 7/043 340/870.07 |
| 2005/0139011 A1 | | 6/2005 | Yamakawa |
| 2010/0083767 A1 | * | 4/2010 | Kurtz et al. .................. 73/724 |
| 2010/0097232 A1 | * | 4/2010 | Lee et al. .................... 340/626 |
| 2010/0131213 A1 | * | 5/2010 | Bleys ................. G01L 19/086 702/50 |
| 2014/0130587 A1 | * | 5/2014 | Von Herzen ........ G01M 15/042 73/114.55 |
| 2014/0266065 A1 | * | 9/2014 | Von Herzen .......... G01N 21/49 320/137 |

OTHER PUBLICATIONS

International Search Report, Jul. 4, 2014, 3 pages.

* cited by examiner

*Primary Examiner* — Lisa Caputo
*Assistant Examiner* — Jonathan Dunlap
(74) *Attorney, Agent, or Firm* — Fulwider Patton LLP

(57) ABSTRACT

A passively powered gas sensor for remotely reading and transmitting a gas pressure of a system, comprising a hollow cylindrical body, a stem axially aligned and extending outwardly from a first surface of the hollow cylindrical body, a pressure sensing element in the stem, and an antenna coupled to the pressure sensing element, where the antenna is located within the hollow cylindrical body and the stem. The pressure sensing device is polled remotely by a polling device, and powered by the polling device.

6 Claims, 3 Drawing Sheets

OXYGEN SYSTEM HAVING SENSORS WITH A PASSIVE RFD INTERFACE

CROSS-REFERENCES TO RELATED APPLICATIONS

This application claims priority from U.S. application Ser. No. 61/732,160, filed Nov. 30, 2012, incorporated by reference in its entirety.

BACKGROUND

In many engineering applications, it is necessary to monitor a supply or flow of a pressurized gas, such as oxygen. This is particularly applicable in the fields of medicine and aviation. Current devices that monitor an oxygen system's status for medical and aircraft applications are generally by one of two types. The first type of such monitoring system relies on the use of pneumatic gages that may be prone to inaccuracies, and are neither durable or reliable. The second type of such system uses electronic sensors or switches that may be more durable and accurate that the pneumatic gages, but are prohibitively expensive in many applications and therefore not cost effective.

A typical application (e.g., an aircraft gaseous oxygen system) is illustrated in FIG. 1. Although throughout this document the term "oxygen" is used to discuss the gas, it should be understood that air or any other pressurized gas could be used with the present invention. A similar discussion could apply to a medical oxygen systems or other types of oxygen systems. In the system depicted in FIG. 1, high pressure oxygen such as 2000 psi is stored in the oxygen cylinder assembly 18, secured by cylinder mounting brackets 21. The oxygen cylinder assembly 18 includes a high pressure hose 6 that leads to an overboard discharge outlet 25 in case of overpressurization. A first high pressure line 20 leads to a fill valve 5 and a second high pressure line 22 mates with a tee fitting 23, that leads to a pressure transducer 19 and a pressure gauge 2 for monitoring the pressure. A low pressure hose 17 feeds another system via a low pressure switch 3. A regulating device that is a component of the oxygen cylinder assembly maintains an operating output pressure of 70 psi. In order to determine the amount of oxygen remaining in the system, the pressure in the cylinder is monitored by both a pressure gauge 2 and pressure transducer 19. Additionally, a low pressure switch or another pressure transducer 3 monitors the regulated output and remains closed as long as a minimum regulated pressure is present. These devices are in continuous operation and the pressure transducer 19 and low pressure switch 3 are continuously drawing power whenever the aircraft is operating. Thus, it would be beneficial to provide a system and method which is more accurate and draws less power than previous systems.

SUMMARY OF THE INVENTION

The present invention utilizes solid state sensors with passive RF energy harvesting technology to monitor the status of an oxygen system by measuring the pressure and/or flow of oxygen in the oxygen storage/delivery system. The condition (pressure or flow) is only read and presented when a mechanic or operator needs the information and makes an inquiry using either a fixed or portable instrument reader. By employing only passive energy readers, the system is more reliable, requires less maintenance, saves energy, and reduces both weight and cost over prior art systems.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
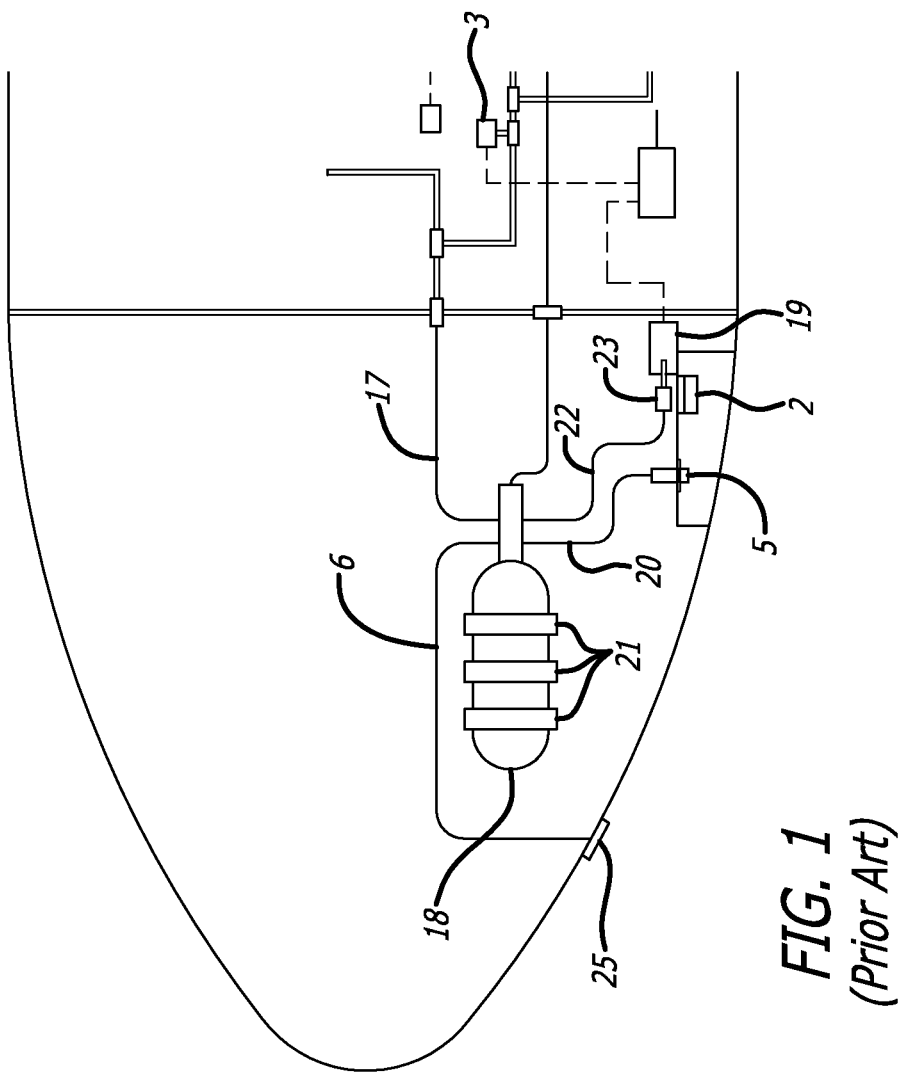
FIG. 1 is a schematic drawing of a prior art pressurized gas system in an aircraft.
Figure 2:
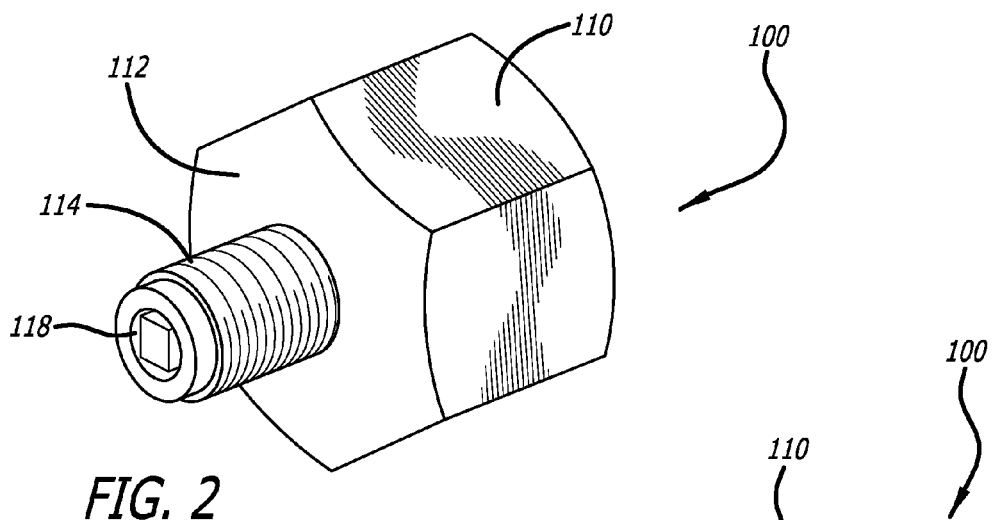
FIG. 2 is an elevated perspective view of a first embodiment of the sensor of the present invention.
Figure 3:
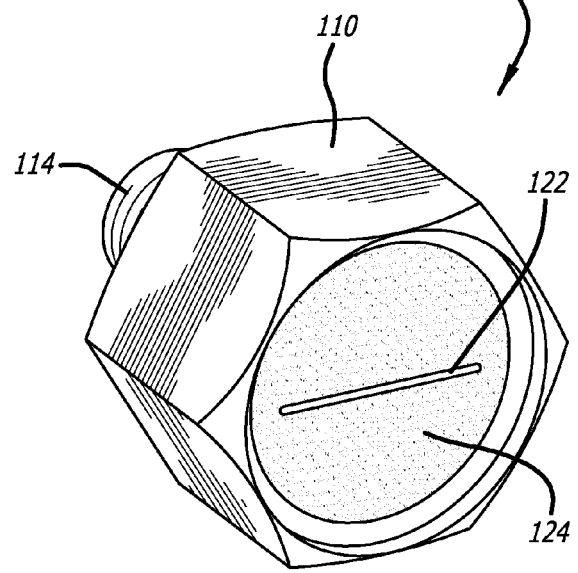
FIG. 3 is another elevated perspective view of the embodiment of FIG. 2.
Figure 4:
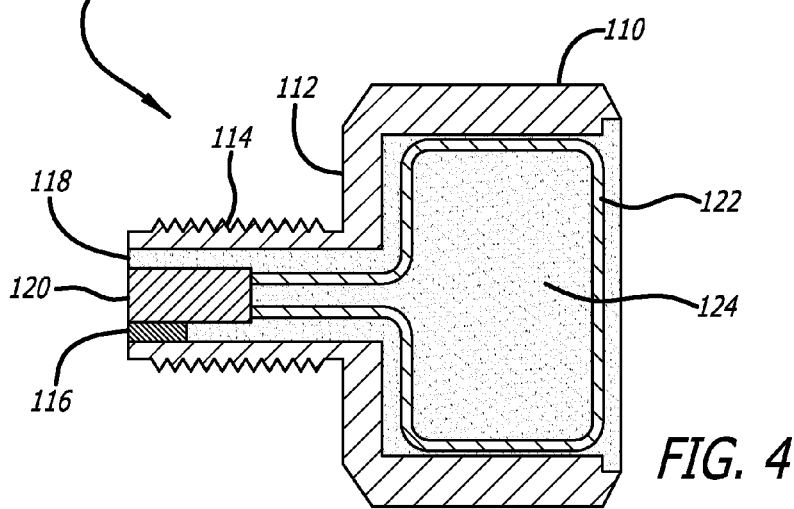
FIG. 4 is a cross sectional view of the embodiment of FIG. 2 and FIG. 3.

An example of a new gas sensor RF device 100 is shown in FIGS. 2-4 for an aircraft application such as that described with respect to FIG. 1. As shown in FIGS. 2-4, the gas sensor RF device 100 is designed to be installed into a standard regulating component via a standard threaded fitting so that no modification of current equipment is required. For example, two gas sensor RF pressure sensing devices would be installed in the system depicted in FIG. 1. In this oxygen monitoring system, both gas sensor devices are designed to read the actual gas pressure at the sensor. The first gas sensor RF device would be installed in the high pressure port that the high pressure line 22 (see FIG. 1) occupies. The second gas sensor RF device could be installed in any unused low pressure port such as at the tee fitting 23 as shown in FIG. 1. These two gas sensor RF devices would replace the low pressure switch 3 and the high pressure line 22 in FIG. 1.

FIG. 2 shows a gas sensor pressure reader 100 having a hexagonal profile housing 110, although other profile configurations are possible. Since any polygonal configuration will work, the term "cylindrical" herein may be used to describe a broad number of configurations that includes a hexagonal a profile, as well as octagonal and other polygons. Cylindrical could also include circular profiles, where the outer surface would preferably be knurled or include some ridges to allow a user to grasp and rotate the sensor. The benefit of the hexagonal shape is that it can easily be installed and removed with a standard socket or wrench. On a lateral face 112 of the hexagonal housing 110, an outwardly projecting stem 114 is axially aligned and includes a pressure sensing element 116 disposed therein. The stem 114 is preferably threaded externally and includes an open distal end 118 where the sensing element 116 is present. When the external stem 114 is threaded into the pressure system, the stem 114 is exposed to the internal pressure of the system, such that it can determine the pressure inside the tank/line/system. The sensing element 116 is preferably part of a printed circuit board 120, which is passively powered by a remote reader using, for example, harvested RF energy. The circuit board 120 is coupled to an antenna 122 that forms a closed loop passing through the stem's interior and around the hexagonal housing 110. FIGS. 3 and 4 illustrate the antenna 122 and the position of the circuit board 120 within the housing 110. The remainder of the interior of the housing is filled with an encapsulating material 124 that protects the antenna and the circuit board from moisture, dust, and debris. FIG. 4 illustrates the antenna 122 and the encapsulating material 124 within the interior of the hexagonal housing.

Figure 5:
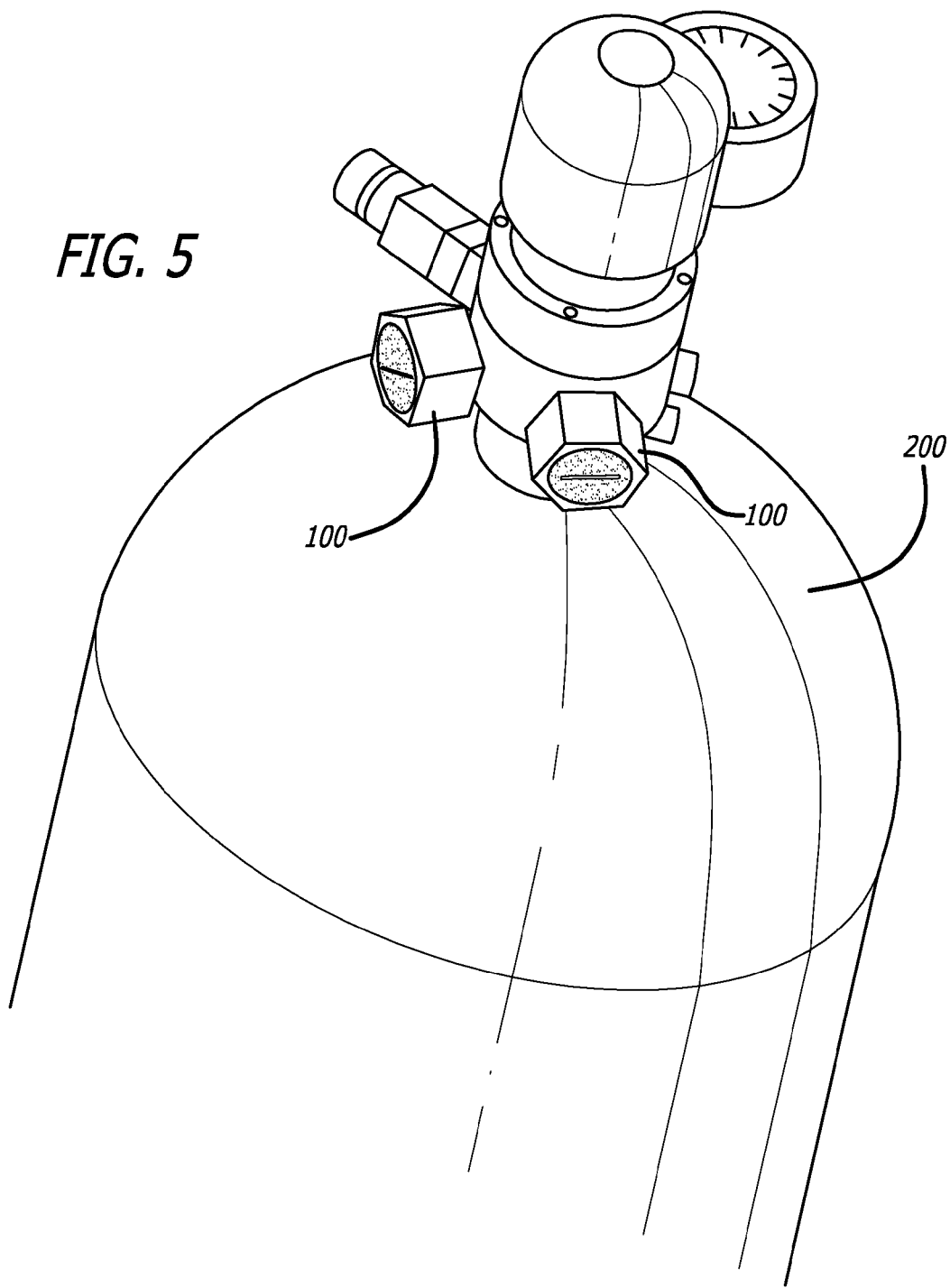
FIG. 5 is an elevated perspective view of an installation employing the embodiment of FIG. 2.

FIG. 5 illustrates two gas sensor RF devices 100 installed on an oxygen tank 200. In this arrangement, components 2, 3, 19, 22 and 23 in FIG. 1 are eliminated. The gas sensor RF devices 100 preferably utilize coding protocol such as ISO/IEC 18000-6 to store and transmit the information to a remote receiving device, such as such as a hand held or fixed data receiving device. Sensor readers poll the gas sensor RF devices to make the data available to the mechanic or operator. The sensor readers (not shown) can either be fixed or portable, and are initiated by the operator's command or actuated electronically at selected time intervals. The readers preferably read the sensors 100 remotely using a wireless connection, permitting data exchange in areas where the oxygen supply may be inaccessible or difficult to access. The reader then displays, stores, or transmits the value so that the mechanic or operator evaluate the status or condition of the oxygen storage system. Portable readers can include those commercially available that are capable of reading passive RF information that comply with ISO/IEC 18000-6. These readers are preferably utilized when a portable device can be employed so that one reader can serve multiple sensors, or in maintenance conditions when power to a fixed reader may not be available. Alternatively, fixed readers can also be used that are similar to the portable reader, with the exception that they are adapted to a stationary location. Readers with dual power sources can also be utilized that use stored or harvested energy, but are also capable of automatic switching to generated power when needed.

There are numerous advantages of the present invention over methods of gas monitoring systems of the prior art. An important primary advantage is the reduction and conservation of power consumption in the instruments. The gas sensor RF device of the present invention is a passive element that is powered by the reader. The reader uses batteries or harvested power, so they do not normally require system-generated or line power for operation. Moreover, power from the associated reader is utilized on an intermittent basis, only during the period that an actual reading is occurring. Thus, power drain on the system is minimal.

Another advantage of the present invention is that standard Bourdon-type tube gauges are susceptible to the problems associated with moisture and dust, and operate effectively in a narrow temperature range. These gages can be easily damaged by shock and vibration, and lack the accuracy and precision of electronic devises. Conversely, the present invention has no moving parts, does not draw power except during the period that the reading is being made, and is therefore far more reliable.

Using the present invention, a mechanic or technician can accurately determine the status of the remaining oxygen capacity in an oxygen storage system without powering up the system. Using the wireless embodiment, the mechanic can easily make a reading when the gas cylinder is in a location that is not easily accessible because direct access is not required. Because the system is free of wires or cables, there is less clutter and less opportunity to have wires become damaged or broken, further enhancing the reliability of the system. Moreover, with the gas sensor RF device reading the pressure directly at the source, there is no adjustment necessary for temperature effects that can complicate the reading or cause errors in measuring the true status of the system. The Sensor RF device reads actual values present.

Another advantage that is especially important to aircraft applications is the reduction in weight of the system. When using the application shown in FIG. 1, the estimated net weight of the system with current technology compared to a system using Senor RF devices

| FIG. 1 System | Weight |
|---|---|
| Transducer | 150 grams |
| L.P. Switch | 120 grams |
| HP Line | 36 grams |
| Bulkhead Tee | 158 grams |
| Gauge (Bourdon) | 54 grams |
| TOTAL | 518 grams |

| FIG. 1 System with Sensor RF devices | |
|---|---|
| Sensor RF HP | 35 grams |
| Sensor RF LP | 35 grams |
| Reader Fixed | 280 grams |
| TOTAL | 350 grams |

| Net Weight Reduction | |
|---|---|
| TOTAL | −168 grams |

A prototype of the present invention showed that the device can read up to 2900 psi using RF energy from a remote reader, and rates of between 0.5 lpm to 600 lpm. The device can be used for aircraft systems, medical systems, therapeutic systems, and clinical systems. As an alternative embodiment, the sensor can be a hybrid powered system where the power source is used as a back-up to the RF reader supplied energy.

The present invention also simplifies installation and replacement/removal of the system. With fewer connections to the system, removal of the oxygen cylinder assembly is much easier. The present invention eliminates the need for electrical cables to connect or disconnect, and there are fewer leak paths that can lead to leakage problems. Yet another advantage of the present system is that it monitors actual flow, i.e., it takes direct reading of flow rates to detect abnormal operation, leaks, or operational trends. Also, direct reading of flow rates and pressures without direct connection to the unit under test simplifies test set up and makes the collection of data less affected by the collection means.

The foregoing descriptions and illustrations are intended to be exemplary but not exclusive. One of ordinary skill in the art would recognize various modifications to the description of the embodiments depicted, and the present invention is intended to encompass all such modifications.

Other features and advantages of the present invention will become more apparent from the following detailed description of the preferred embodiments in conjunction with the accompanying drawings, which illustrate, by way of example, the operation of the invention.

We claim:

1. A passively powered gas sensor for remotely reading and transmitting a gas pressure of a system, comprising:
   a hollow cylindrical body;
   a stem axially aligned and extending outwardly from a first surface of the hollow cylindrical body, the stem having an interior surface and a threaded exterior surface, the stem including a path that permits a gas to enter only partially into the stem;

a pressure sensing element in the stem adjacent the path that permits a gas to enter only partially into the stem;

an antenna coupled to the pressure sensing element, where the antenna is located within the hollow cylindrical body and the stem;

wherein the pressure sensing device is polled remotely by a polling device, and powered by the polling device; and wherein the passively powered gas sensor has no moving components and does not continuously monitor a pressure.

2. The passively powered gas sensor of claim 1 wherein the cylindrical body has a hexagonal profile.

3. The passively powered gas sensor of claim 1, wherein the polling device powers the sensor with RF energy.

4. The passively powered gas sensor of claim 1, further comprising a printed circuit board that carries the pressure sensing element, the printed circuit board disposed entirely within the stem.

5. The passively powered gas sensor of claim 1, wherein the hollow cylindrical body is filled with encapsulating material.

6. The passively powered gas sensor of claim 1, wherein the sensor can read pressures up to 2900 psi.

* * * * *